US008612585B2

(12) United States Patent
    Alstad

(10) Patent No.: US 8,612,585 B2
(45) Date of Patent: *Dec. 17, 2013

(54) IN-LINE NETWORK DEVICE FOR STORING APPLICATION-LAYER DATA, PROCESSING INSTRUCTIONS, AND/OR RULE SETS

(75) Inventor: Kent Alstad, Sechelt (CA)

(73) Assignee: Radware, Ltd., Tel Aviv (IL)

( * ) Notice: Subject to any disclaimer, the term of this patent is extended or adjusted under 35 U.S.C. 154(b) by 64 days.

This patent is subject to a terminal disclaimer.

(21) Appl. No.: 13/226,394

(22) Filed: Sep. 6, 2011

(65) Prior Publication Data

US 2012/0233318 A1      Sep. 13, 2012

Related U.S. Application Data

(63) Continuation of application No. 12/023,964, filed on Jan. 31, 2008, now Pat. No. 8,037,127, which is a continuation-in-part of application No. 11/359,637, filed on Feb. 21, 2006, now Pat. No. 7,937,435, and a continuation-in-part of application No. 11/623,028, filed on Jan. 12, 2007, now Pat. No. 8,166,114.

(51) Int. Cl.
    *G06F 15/173*    (2006.01)

(52) U.S. Cl.
    USPC ........... 709/224; 709/203; 709/206; 709/207; 709/230

(58) Field of Classification Search
    USPC ................ 709/203, 206, 207, 224, 238, 246
    See application file for complete search history.

(56) References Cited

U.S. PATENT DOCUMENTS

| 5,564,070 | A | 10/1996 | Want et al. |
| 5,784,562 | A | 7/1998 | Diener |
| 6,038,601 | A | 3/2000 | Lambert et al. |
| 6,334,114 | B1* | 12/2001 | Jacobs et al. ................. 705/26.8 |
| 6,370,687 | B1 | 4/2002 | Shimura |
| 6,385,641 | B1 | 5/2002 | Jiang et al. |
| 6,457,103 | B1 | 9/2002 | Challenger et al. |
| 6,604,143 | B1 | 8/2003 | Nagar et al. |
| 6,618,751 | B1 | 9/2003 | Challenger et al. |
| 6,839,741 | B1 | 1/2005 | Tsai |
| 7,043,460 | B2 | 5/2006 | Deboer et al. |
| 7,096,418 | B1 | 8/2006 | Singhal et al. |

(Continued)

FOREIGN PATENT DOCUMENTS

| NZ | 566291 | 2/2008 |
| WO | 0178334 | 10/2001 |
| WO | 0186494 | 11/2001 |

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

(Continued)

*Primary Examiner* — Barbara Burgess
(74) *Attorney, Agent, or Firm* — Myers Wolin, LLC

(57) ABSTRACT

A network device located in the data path between a user computer and a server stores application data, processing instructions, and/or rule sets. By storing user computer-specific application data, processing instructions, and/or rule sets in the data path between the user computer and the server, the invention reduces the complexity of the web server, improves the handling of server failure, and increases the overall scalability and performance of the system.

24 Claims, 10 Drawing Sheets

(56) References Cited

U.S. PATENT DOCUMENTS

| | | | |
|---|---|---|---|
| 7,139,780 B2 | 11/2006 | Lee et al. | |
| 7,194,522 B1 | 3/2007 | Swildens et al. | |
| 7,266,595 B1 | 9/2007 | Black et al. | |
| 7,295,953 B2 | 11/2007 | Cox et al. | |
| 7,392,294 B2 | 6/2008 | Hellstrom | |
| 7,398,304 B2 | 7/2008 | Smith et al. | |
| 7,469,280 B2 | 12/2008 | Simpson | |
| 7,581,014 B2 * | 8/2009 | Mittig et al. | 709/230 |
| 7,711,854 B2 | 5/2010 | Ecklund et al. | |
| 7,865,585 B2 | 1/2011 | Samuels et al. | |
| 7,895,256 B2 * | 2/2011 | Zombek et al. | 709/200 |
| 8,001,175 B2 | 8/2011 | Betancourt et al. | |
| 8,037,127 B2 * | 10/2011 | Alstad | 709/203 |
| 2002/0065899 A1 | 5/2002 | Smith et al. | |
| 2002/0156881 A1 | 10/2002 | Klopp Lemon et al. | |
| 2003/0004937 A1 | 1/2003 | Salmenkaita et al. | |
| 2003/0004998 A1 | 1/2003 | Datta | |
| 2003/0040995 A1 | 2/2003 | Daddario et al. | |
| 2003/0065810 A1 | 4/2003 | Ims et al. | |
| 2003/0078964 A1 | 4/2003 | Parrella, Sr. et al. | |
| 2003/0191812 A1 | 10/2003 | Agarwalla et al. | |
| 2003/0204769 A1 | 10/2003 | Coughlin | |
| 2003/0225897 A1 | 12/2003 | Krawetz | |
| 2004/0043758 A1 | 3/2004 | Sorvari et al. | |
| 2004/0117438 A1 | 6/2004 | Considine et al. | |
| 2004/0205165 A1 | 10/2004 | Melamed et al. | |
| 2004/0236824 A1 | 11/2004 | Millington et al. | |
| 2004/0268357 A1 | 12/2004 | Joy et al. | |
| 2005/0033855 A1 | 2/2005 | Moradi et al. | |
| 2005/0038898 A1 * | 2/2005 | Mittig et al. | 709/230 |
| 2005/0108335 A1 | 5/2005 | Naick et al. | |
| 2005/0138033 A1 | 6/2005 | Katta et al. | |
| 2005/0188048 A1 | 8/2005 | Yuan et al. | |
| 2005/0210243 A1 | 9/2005 | Archard et al. | |
| 2005/0261985 A1 | 11/2005 | Miller et al. | |
| 2006/0015512 A1 | 1/2006 | Alon et al. | |
| 2006/0095527 A1 | 5/2006 | Malik | |
| 2006/0143290 A1 | 6/2006 | Dostert et al. | |
| 2006/0212149 A1 | 9/2006 | Hicken et al. | |
| 2006/0212601 A1 | 9/2006 | Hampton | |
| 2006/0224723 A1 | 10/2006 | Chen | |
| 2006/0225065 A1 | 10/2006 | Chandhok et al. | |
| 2006/0235941 A1 | 10/2006 | Arcas et al. | |
| 2007/0005603 A1 | 1/2007 | Jain et al. | |
| 2007/0174644 A1 | 7/2007 | Willig | |
| 2007/0180035 A1 | 8/2007 | Liu et al. | |
| 2007/0260748 A1 | 11/2007 | Talkington | |
| 2007/0268865 A1 | 11/2007 | Garcia et al. | |
| 2007/0291741 A1 | 12/2007 | Hwang | |
| 2008/0008109 A1 | 1/2008 | Ollis | |
| 2008/0016240 A1 | 1/2008 | Balandin | |
| 2008/0208961 A1 | 8/2008 | Kim et al. | |
| 2009/0132658 A1 | 5/2009 | Glickstein | |
| 2009/0254707 A1 | 10/2009 | Alstad | |
| 2009/0270076 A1 | 10/2009 | Zhou et al. | |
| 2011/0295979 A1 | 12/2011 | Alstad et al. | |

OTHER PUBLICATIONS

"Optimize caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

* cited by examiner

IN-LINE NETWORK DEVICE FOR STORING APPLICATION-LAYER DATA, PROCESSING INSTRUCTIONS, AND/OR RULE SETS

CROSS-REFERENCE TO RELATED APPLICATIONS

The present application claims priority as a continuation of U.S. patent application Ser. No. 12/023,964 for "In-Line Network Device for Storing Application-Layer Data, Processing Instructions, and/or Rule Sets," filed Jan. 31, 2008, which is incorporated herein by reference.

U.S. patent application Ser. No. 12/023,964 claims priority as a continuation-in-part of U.S. patent application Ser. No. 11/359,637 for "Storing and Retrieving User Context Data," filed Feb. 21, 2006, which is incorporated herein by reference.

U.S. patent application Ser. No. 12/023,964 further claims priority as a continuation-in-part of U.S. patent application Ser. No. 11/623,028 for "Asynchronous Context Data Messaging," filed Jan. 12, 2007, which is incorporated herein by reference.

BACKGROUND OF THE INVENTION

1. Field of the Invention

The invention generally relates to improving performance and scalability in web-enabled applications, and, specifically, to the use of an in-line network device for storing application-layer data, instructions, and/or rule sets.

2. Description of Background Art

On the World Wide Web (i.e. the "web"), it is frequently desirable to store application-layer data and/or programming instructions for web-based applications. For example, many applications need to maintain application data to retain state relating to previous interactions with that same client. For example, a user may indicate certain preferences regarding the display of a particular website, and it may be desirable to associate those preferences with the user computer for future visits.

However, standard mechanisms for storing such data provide only a very limited capability and do not scale well as multiple web servers are added to handle increased traffic. Certain methods, such as cookies, create scalability and performance issues and also can raise privacy and security concerns. Such cookies are also subject to limitations in size and quantity.

Other techniques for storing data on the user computer include ASP.NET ViewState, hidden form fields, and URL query strings. However, all of these techniques require extensive communication of data (and in some cases instructions) between servers and client computers, creating performance and scalability issues.

Such techniques often provide no efficient, scalable, generalized, secure method of storing data, or for transmitting such information between client and server. Furthermore, such techniques are often inefficient when used in the context of a load-balanced multiple-server environment. Data transmitted from a client to one of the servers in the multiple-server environment, and stored on the designated server, may not be easily retrievable by other servers. This forces subsequent requests to be directed to the same server, even when load conditions may have changed, causing another server to have greater availability of capacity. This static association between a user computer and a web server reduces the effectiveness of load balancing. Load balancing techniques have difficulty assigning page requests to web servers evenly when a large portion of incoming page requests must necessarily be assigned to a specific web server.

Application data can be stored in a server external to the web server. However, storing application data external to the web server introduces several extra steps. In order to process a request, the web server must receive the request, determine the need for application data, request the application data from the external server, wait for a response, process that response, write the updated application data back to the external state server, and finally return the web request. These extra steps introduce delay, complexity, and the potential for failure.

What is needed is a method for effectively embedding application-layer data in standard network messages between clients and servers, in a manner that supports redundancy and is compatible with load-balancing techniques, and without adding unnecessary complexity or steps to the method of the web server.

SUMMARY OF THE INVENTION

According to the present invention, a network device, referred to as an appliance, located in the data path between a user computer and a server stores application data, as well as instructions and/or rule sets. This facilitates implementation of a distributed computing environment in which application data, instructions, and/or rule sets for upstream and/or downstream processes can be stored at the appliance and embedded in standard network messages passing among the appliance, servers, and the user computer, such as those messages used to respond to client requests.

In a network including a router and a number of application servers that respond to requests from clients, the appliance can be positioned between the router and the application servers. The appliance can be implemented as a single device or a set of devices acting in series or in parallel. Software runs on the application servers to facilitate communication with the appliance according to the techniques described herein. All requests coming through the router from client devices to the application servers and all responses sent from the application servers to fulfill client requests pass through the appliance.

As described in more detail herein, the appliance performs the following functions:
Reads incoming requests
Uses index data in the requests to retrieve stored data, processing instructions, and/or rule sets
Applies a configurable set of algorithms to edit the requests
Reads outgoing responses
Extracts and operates on data added to the response by software running on the application server
Extracts and executes processing instructions and/or rule sets added to the response by software running on the application server
Applies a configurable set of algorithms to edit the responses
Maintains a data store The software running on the application servers performs the following functions:
Reads incoming requests
Extracts and operates on data added to the requests by the appliance
Extracts and executes processing instructions and/or rule sets added to the requests by the appliance
Interacts with application software running on the server to assist in processing requests Applies a configurable set of algorithms to add data, processing instructions, and/or rule sets to the response to be extracted by the appliance In one embodiment, the appliance consists of hardware and software. The software that runs on the appliance is a modular and extensible set of treatments, or plug-ins, that primarily operate on requests and responses passing through the appliance and that employ a common data store. As described below, the appliance and the software running on the application servers communicate with one another using application requests and responses. However, in some embodiments, the appliance and the software running on the application servers can optionally communicate with one another directly, asynchronously and independently of the flow of requests and responses, if such a communication path is available.

In one embodiment, the appliance is implemented as part of a router in the data path between the user and the web server (and/or application server). The router performs the data storage, retrieval, and communication functions herein described in addition to the functions commonly performed by a router.

DETAILED DESCRIPTION OF THE EMBODIMENTS

Figure 1A:
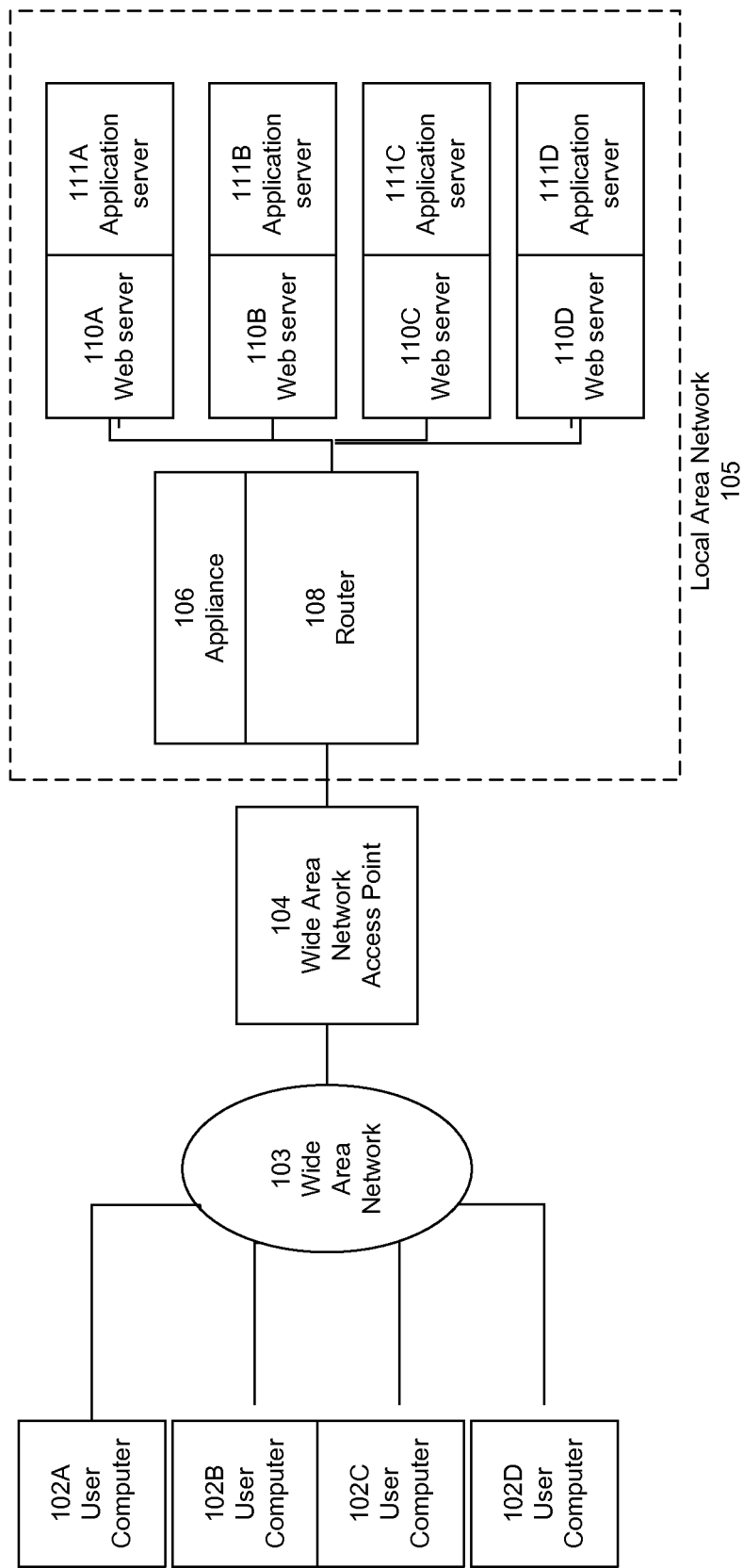
FIG. 1(A) is a block diagram illustrating a combined appliance and router, connected in the data path of a typical wide area network connection, according to one embodiment of the present invention.

In one embodiment, the present invention is implemented as a combination of hardware and software. An appliance is positioned in-line between the router and the application servers. The appliance can be implemented as a single device or a set of devices acting in series or in parallel. Software runs on the application servers so as to communicate with the appliance. In one embodiment, the invention uses the Microsoft web server application suite ASP.NET. ASP.NET application server software may be implemented in several forms, including the following:

ASP.NET providers
(http://msdn2.microsoft.com/en-us/library/aa479030.aspx)
ASP.NET controls
(http://msdn2.microsoft.com/en-us/library/zt27tfhy.aspx)
ASP.NET control adapters
(http://msdn.microsoft.com/msdnmag/issues/06/10/ExtremeASPNET/)
ASP.NET data providers
(http://msdn.microsoft.com/msdnmag/issues/01/12/DataProv/)
IIS ISAPI extension
(http://msdn2.microsoft.com/en-us/library/ms525172.aspx)
ASP.NET HTTP modules and handlers
(http://support.microsoft.com/kb/307985).

One skilled in the art will recognize that the invention can be implemented using other types of application servers and communication paradigms. The invention takes advantage of close integration with application server software both in the software that runs on the servers and also in the software that runs on the appliance.

As described in more detail below, the appliance examines and edits data, instructions, and/or rule sets passing through it at the application level. In the context of the present invention, the application level refers to the seventh layer of the Open Systems Interconnection Basic Reference Model, commonly called the OSI model or the seven-layer model. The mechanism of the present invention enables the appliance to read and edit application-level data, instructions, and/or rule sets contained in the body and headers of http requests and responses.

Embodiments of the present invention are now described with reference to the figures where like reference numbers indicate identical or functionally similar elements.

According to one embodiment of the present invention, the appliance is located in-line, i.e., within the data path between the user computer and the web server, so that the system of the present invention has the opportunity to intercept messages from the user computer to the web server and from the web server to the user computer. The appliance stores and retrieves application data, instructions, and/or rule sets by reading application data, instructions, and/or rule sets from messages passing between the web server and the user computer. The appliance may also insert or use index data in messages passing between the web server and the user computer to facilitate the retrieval of application data, instructions, and/or rule sets. The appliance may also remove application data, instructions, rule sets, and/or index data from messages passing between the web server and the user computer. By performing at least some of these functions in the data path between the web server and the user computer, the appliance reduces the need for additional application data request and update messages, and reduces the size of response data.

For the purposes of illustration, the term "user computer" will be employed throughout this disclosure to refer to any electronic device capable of sending and receiving messages on a network. A non-exhaustive list of examples of user computers includes personal computers, enterprise computing systems, cell phones, handheld devices, personal digital assistants (PDAs), gaming consoles, and portable entertainment systems. One skilled in the art will recognize that any number of devices may be implemented to fulfill the role of the "user computer" described herein without departing from the scope of the present invention.

The appliance may use methods to associate application data, instructions, and/or rule sets with a specific user, or it may use methods to associate application data, instructions, and/or rule sets with a specific user computer. Some computer systems support multiple users on the same computer, and some users may use multiple computers. The invention is equally applicable to both user-specific application data, instructions, and/or rule sets and user computer-specific application data, instructions, and/or rule sets.

The invention is concerned with the storage of application data, instructions, and/or rule sets for web-enabled interactions, and with the communication of such application data, instructions, and/or rule sets between a server and a client. Such items can be any data, instructions, and/or rule sets used or usable by a web-based application in operation. For example, it may be desirable for a web server or application server to maintain shopping cart information relating to a specific user, for a file server to store a history of file accesses relating to a specific user computer, or for a game server to store game-play information relating to a specific user. The invention assists a server in responding to data requests by storing and retrieving data, instructions, and/or rule sets pertaining to the user or user computer originating those requests, and by passing the relevant information to the web server and/or application server, without requiring additional communications with external servers. The invention reduces the size of responses sent to client computers by extracting and storing data embedded in the responses and replacing the verbose data with index data. The index data in subsequent requests is then replaced with the stored verbose data, which is sent to the server. Operations can be controlled by instructions and rule sets in the verbose data.

Accordingly, the appliance of the present invention is adapted to extract and operate on data added to the response by software running on the application server, as well as to extract and execute processing instructions and/or rule sets added to the response by software running on the application server. Similarly, the software running on the application server is adapted to extract and operate on data added to the request by the appliance, as well as to extract and execute processing instructions and/or rule sets added to the request by software running on the appliance. In this manner, the present invention provides a paradigm by which application servers can initiate activity at the appliance, and by which the appliance can initiate activity at the application servers. The present invention is thus able to implement a distributed processing system where instructions, data, and/or rule sets are sent to various components (such as the appliance and application servers) for use and execution thereon.

Application data, instructions, and/or rule sets may come in many forms, and the invention is applicable to all such forms. One skilled in the art will recognize that other forms of application data, instructions, and/or rule sets having other uses may be stored and/or processed according to the techniques described herein without departing from the essential characteristics of the present invention. For purposes of the following discussion, the term "application data, instructions, and/or rule sets" is intended to include data, instructions, rule sets, working data, and any other programmatic, declarative, descriptive information, or the like.

For the purposes of illustration, the invention is frequently described herein as being useful in conjunction with HTTP requests, HTTP responses, web servers, and/or application servers. However, it will be apparent to one skilled in the art that the invention is useful in conjunction with any kind of data request, any kind of data response, any kind of data server, and any form of index data.

The appliance is described as a server for the purposes of illustrating one embodiment of the present invention. According to another embodiment of the present invention, the function of the appliance can be performed by any device capable of storing and retrieving a segment of data.

FIG. 1(A) is a block diagram illustrating a combined appliance and router, connected in the data path of a typical wide area network connection, according to one embodiment of the present invention. Each user computer 102 is a device capable of making requests for data over a wide area network. For example, user computer 102 can be a personal computer executing a standard web browser program, or it can be a portable device requesting data using another protocol. In one embodiment, there are a plurality of user computers 102A, 102B, 102C, and 102D connected to a wide area network 103, and each user computer 102 may have some unique application data, instructions, and/or rule sets associated with the past actions of said user computer 102.

Each user computer 102 is capable of storing index data at the request of a server connected to the wide area network 103. Once stored, this index data is sent to the server as a component of future data requests, according to the techniques described herein. The index data may be stored on the user computer 102 and included in future data requests using a variety of methods. For example, according to one embodiment of the present invention, HTTP cookies may be used to store index data on the user computer 102. According to another embodiment of the present invention, HTTP-post hidden form fields, ASP.NET View State fields, HTTP headers, and URL query strings may be used to store index data on the user computer 102.

One skilled in the art will recognize that the examples of methods for storing index data on the user computer 102 are not intended to be exhaustive and that a wide variety of technologies are applicable to the present invention.

Each user computer 102 may be connected to the wide area network 103 through at least one of several connection devices, including routers, modems, and wireless access points. These connection devices are not shown as such connection devices and methods are well known in the art.

The wide area network 103 may be any network capable of connecting a user computer 102 with a web server 110 and/or application server 111. In one embodiment, the wide area network 103 is the Internet. In another embodiment the wide area network 103 is a private network. The wide area network 103 is capable of conveying messages bi-directionally between the user computer 102 and the wide area network access point 104.

The wide area network access point 104 is the point of connection between the wide area network 103 and the local area network 105. The wide area network access point 104 may be a digital subscriber line modem, an analog modem, a cable modem, a network card, a broadband wireless hub, or any other device for transferring data between the wide area network 103 and the local area network 105.

For clarity, the appliance 106, the router 108, the web server 110, and the application server 111 are depicted as components of a local area network 105. However, in one embodiment, the router 108 can in fact be a great distance from the web server 110 and/or application server 111, and can further be considered as part of a separate network. The presentation of the appliance 106, the router 108, the web server 110, and/or the application server 111 as components of the local area network 105 is intended to clarify the description of the invention for the purposes of enablement and is not intended to limit the forms the invention can take.

In one embodiment, the local area network interfaces with a single wide area network access point 104 and includes at least one web server 110 and/or application server 111. Connected between the wide area network access point 104 and the web server 110 and/or application server 111 is at least one router 108. The router or routers 108 are configured to efficiently relay data among the web servers 110 and/or application servers 111 (if multiple web servers 110 and/or application servers 111 are implemented) and between a web server 110 and/or application server 111 and the wide area network access point 104. Other network devices may also be connected to the local area network 105.

In FIG. 1(A), a single router 108 is depicted, with an appliance 106 adjoined. The router 108 is capable of receiving an incoming message and repeating it on at least one of a plurality of network ports. The router 108 may also modify the incoming message before repeating it, such as in the well-known method of network address translation (NAT).

The appliance 106 may be adjoined to the router 108 differently depending on the embodiment of the invention. In one embodiment, the appliance operates using the same physical hardware (such as processor, network ports, electronic storage) as the router 108. In another embodiment, the appliance 106 shares some physical hardware (such as enclosure, power supply, and network ports) but does not share certain other physical hardware (such as processor and electronic storage). In another embodiment, the appliance 106 does not share any physical hardware with the router 108, but the appliance 106 is connected in series to at least one router 108.

In an implementation with multiple routers 108, the appliance 106 can be joined to any one of the routers 108 so long as the placement sets the appliance 106 in the data path between a web server 110 and/or application server 111 and the wide area network access point 104. According to one embodiment of the present invention, multiple appliances are implemented, and are connected either in series or parallel in the data path between a web server (and/or application server) and a wide area network access point. In a preferred embodiment, when multiple routers 108 are implemented hierarchically, the appliance 106 adjoins the router 108 with the highest position in the hierarchy of those routers 108 connected to web servers 110 and/or application servers 111.

The appliance 106 is connected in such a way so that it may intercept messages originating from each user computer 102 and destined for the web server 110 and messages originating from the web server 110 and/or application server 111 and destined for each user computer 102.

The method of the appliance 106 will be described in greater detail in connection with FIGS. 2-5.

The web server 110 is connected to the router 108. The web server 110 is a device capable of receiving a request for data and transmitting data in response, and for communicating with a back-end application server 111. For example, the web server 110 may be an HTTP server capable of receiving page requests and returning web pages according to the HTTP. As another example, the web sever 110 may be any server capable of sending datagrams according to a protocol such as the User Datagram Protocol (UDP), or the Transmission Control Protocol (TCP). The web server 110 may consist of multiple devices, which in conjunction have the capabilities of a web server 110. Although the example of a web server has been chosen for the purposes illustration, one skilled in the art will recognize that the invention is applicable to embodiments employing any device capable of receiving and transmitting data.

The web server 110 and/or application server 111 may be implemented using at least one of the many devices commonly available for responding to data requests. For example, the web server 110 and/or application server 111 may be implemented using a standard Personal Computer (PC) and software such as Apache HTTP Server. The web server 110 could also be implemented, for example, using Microsoft® Internet Information Services, ASP.NET, Classic ASP, JSP, IBM® Websphere, Ruby on Rails, or Linux Apache PHP. The web server could be implemented as an online gaming server. One skilled in the art will recognize that these examples are not intended to be exhaustive and that other implementations of the web server and/or application server are also applicable to the present invention.

Figure 6:
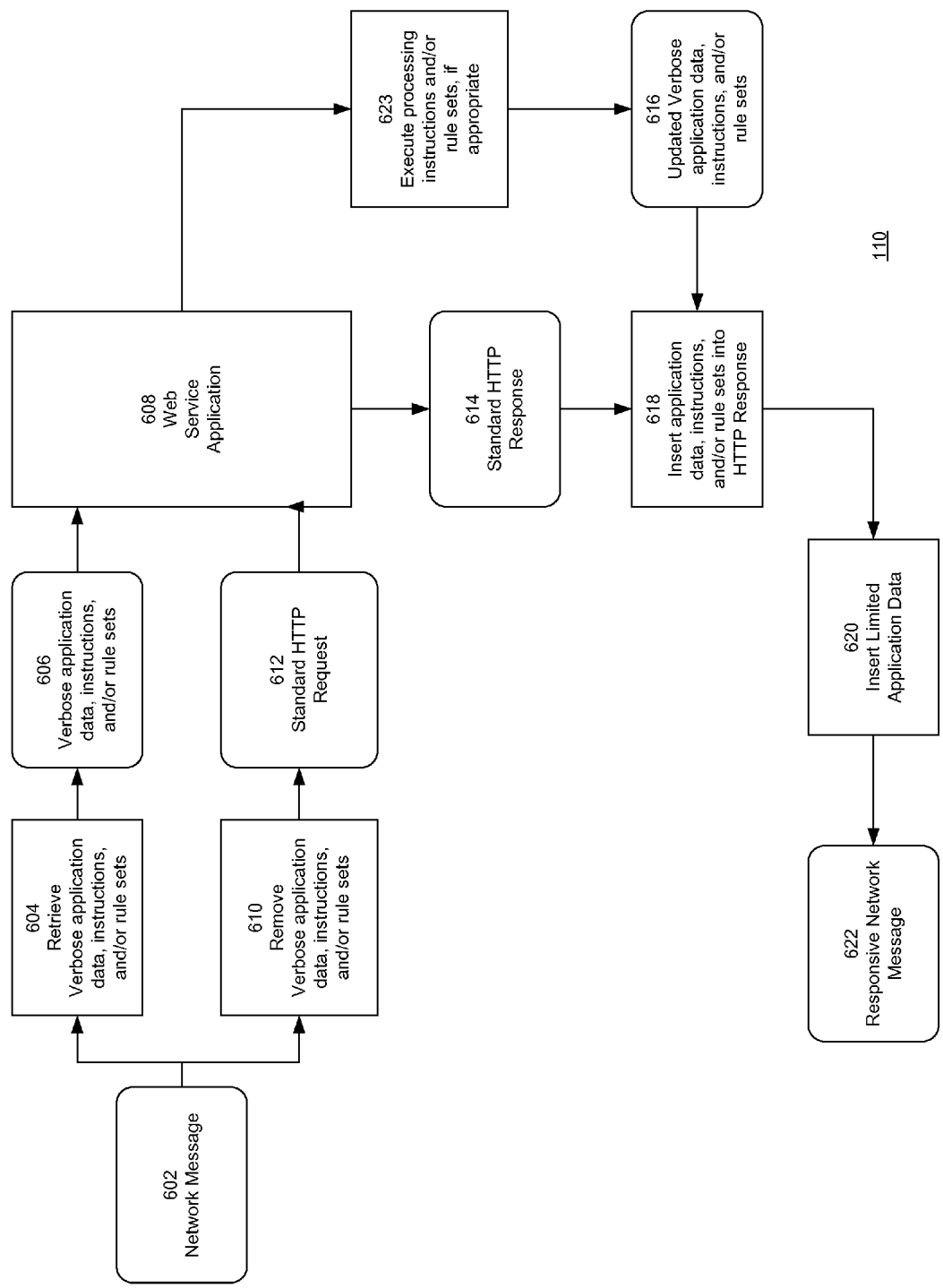
FIG. 6 is a flowchart illustrating a method for responding to a page request containing application data, instructions, and/or rule sets, according to one embodiment of the present invention.

The web server 110 and/or application server 111 may also include methods and/or systems for interfacing with the appliance 106. The method used by the web server 110 and/or application server 111, according to one embodiment of the present invention, is illustrated in FIG. 6.

Figure 1B:
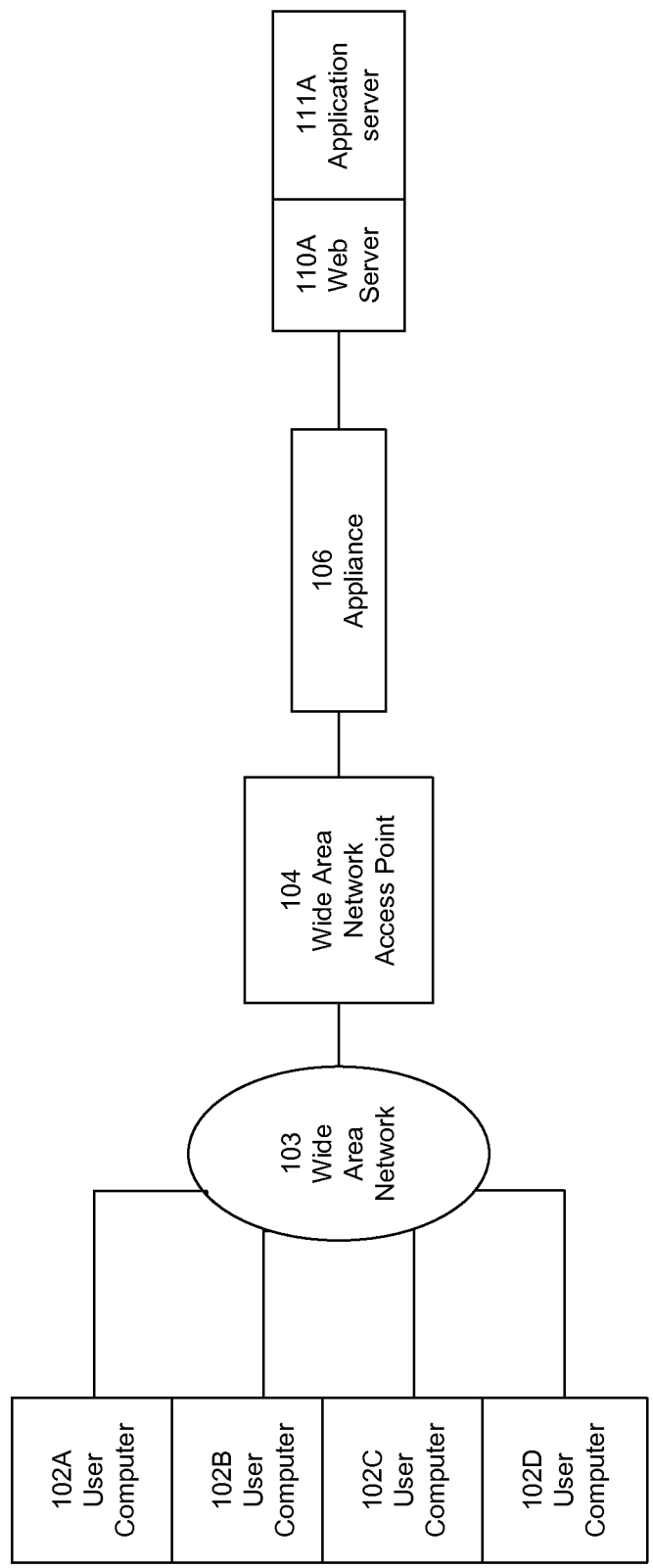
FIG. 1(B) is a block diagram illustrating an appliance connected in the data path of a typical wide area network connection, according to one embodiment of the present invention.

FIG. 1(B) is a block diagram illustrating an appliance connected in the data path of a typical wide area network connection, according to one embodiment of the present invention. The appliance 106 is connected to the wide area network access point 104 and the web server 110 and/or application server 111. The appliance 106 may or may not be adjoined to a router 108.

The user computer 102, wide area network 103, wide area network access point 104, web server 110 and/or application server 111 are similar to those herein described in reference to FIG. 1(A). The appliance 106 is connected in such a way so that it may intercept messages originating from each user computer 102 and destined for the web server 110 and/or application server 111 and messages originating from the web server 110 and/or application server 111 and destined for each user computer 102. The method of the appliance 106 will be described in greater detail in FIGS. 2-5. According to one embodiment of the present invention, the appliance 106 operates without a router and in conjunction with a single web server 110 and/or application server 111.

In one embodiment, the appliance 106 is implemented as a transparent proxy. As described in more detail below, the appliance 106 transparently removes, holds, tokenizes and re-inserts application data, instructions, and/or rule sets, such as ViewState data in ASP.NET pages. In this manner, the appliance 106 reduces bandwidth consumption and transfer time by tokenizing the ViewState received from the server and sending only the ViewState tokens to the client browser. A further advantage of the appliance 106 of the present invention is that it enables developers to use any third party controls, regardless of ViewState size, reducing the need to trade off application features to achieve application responsiveness.

In other embodiments, the appliance 106 is able to perform additional functionality, such as for example:
  insertion of headers to control browser caching (a global time-based browser cache expiry policy);
  dynamic compression (a web-acceleration technique);
  insertion of JavaScript for analytics; and
  SSL encryption.

Figure 1C:
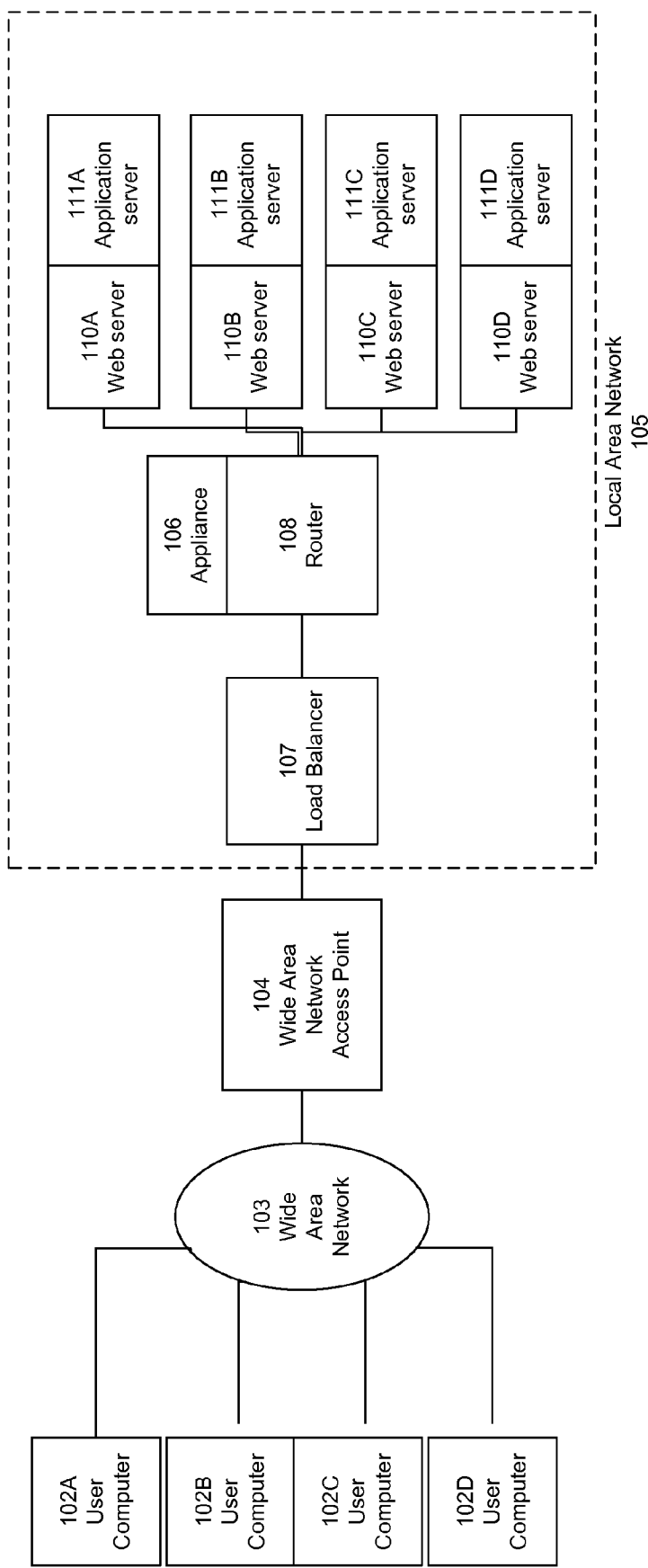
FIG. 1(C) is a block diagram illustrating a combined appliance and router, connected in the data path of a typical wide area network connection, according to one embodiment of the present invention.

FIG. 1(C) is a block diagram illustrating a combined appliance and router, connected in the data path of a typical wide area network connection, according to one embodiment of the present invention. The user computer 102, wide area network 103, wide area network access point 104, appliance 106, router 108, web server 110, and/or application server 111 are similar to those herein described in reference to FIG. 1(A).

According to one embodiment of the present invention, the load balancer 107 is connected to the wide area network access point 104 and to the router 108. The load balancer 107 is capable of receiving an incoming page request and redirecting it to a web server 110 and/or application server 111 on the basis of the current availability of the various web servers 110 and/or application servers 111. For example, if web server 110A is overloaded due to a high volume of page requests, but web server 110B has available request-handling capability, the load balancer 107 directs incoming page requests to web server 110B. The load balancer 107 may be implemented using any one of many commonly available load balancing methods. Such methods can include random allocation, round-robin allocation, weighted round-robin, least connections, and IP hash among others.

In FIG. 1(C), a single router 108 is depicted, with an appliance 106 adjoined. As described herein with reference to FIG. 1(A), the appliance 106 may be adjoined to the router 108 differently depending on the embodiment of the invention. According to one embodiment of the present invention, the appliance 106 does not share any physical hardware with the router 108. The load balancer 107, router 108, and appliance 106 are connected in series, and may be connected in any order, according to one embodiment of the present invention. For example, the load balancer 107 may be connected between the wide area network access point 104 and the appliance 106, or the load balancer 107 may be connected between the appliance 106 and the web server 110. Other methods for connecting the wide area network access point 104, load balancer 107, router 108, and the appliance 106 will be apparent to one of skill in the art without departing from the scope of the present invention. According to one embodiment of the present invention, the appliance 106 may operate in conjunction with a load balancing device, such as the load balancer 107. According to another embodiment of the present invention, the load balancer 107 is adjoined to the appliance 106. The load balancer 107 the appliance 106 may share all, some, or no physical hardware, according to various embodiments of the present invention.

Figure 2:
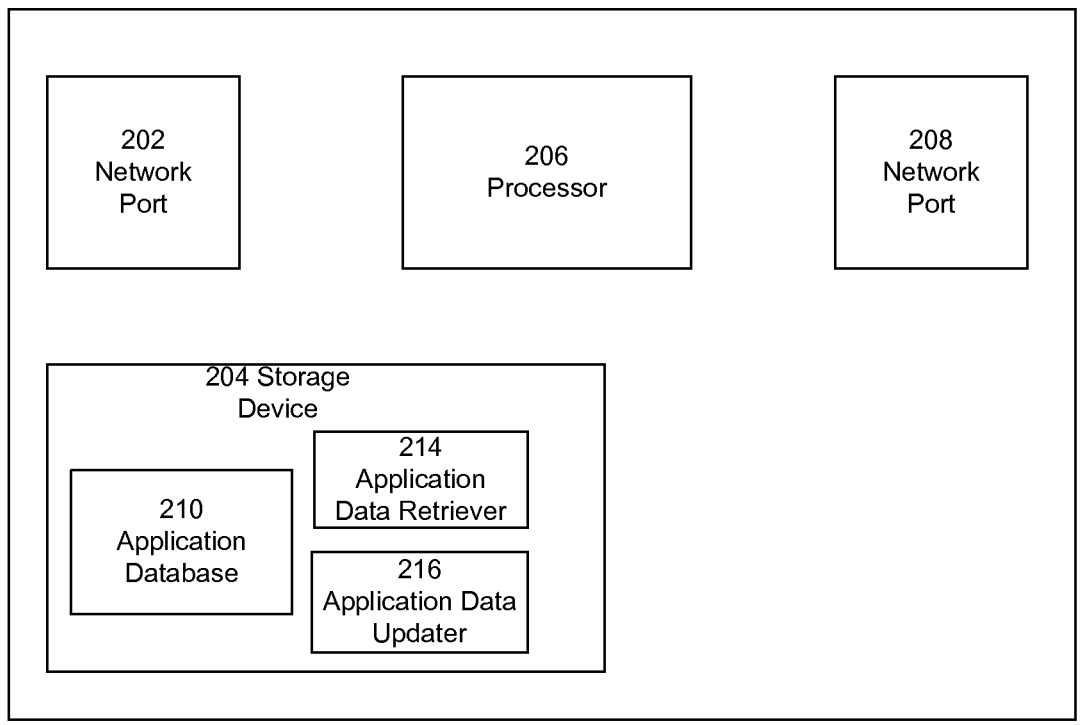
FIG. 2 is a block diagram illustrating the hardware configuration of an appliance, according to one embodiment of the present invention.

FIG. 2 is a block diagram illustrating the hardware configuration of one embodiment of the appliance 106, according to one embodiment of the present invention. As explained previously, some or all of the hardware of the appliance 106 may be shared with the router 108. FIG. 2 illustrates the hardware of the appliance 106 as if said hardware were dedicated, but in fact, some or all of this hardware can be shared with other devices.

The network ports 202 and 208 are standard devices capable of sending and receiving messages over a network. As a pair, the network ports 202 and 208 allow the appliance 106 to be in the data path between the wide area network access point 104 and the web server 110 and/or application server 111. Network messages not requiring the retrieval or storage of application data, instructions, and/or rule sets can be passed from one network device to the other without change, so that the normal operation of the network is not affected. On the other hand, network messages requiring either the retrieval or storage of application data, instructions, and/or rule sets can be read and/or modified as necessary before continuing on the data path to their destination.

The processor 206 is a standard processor capable of executing instructions. Any standard microcomputer processor could be used to implement the processor 206, for example, the x86 family of 32- and 64-bit processors.

The storage device 204 includes at least one of the many common components available for electronic storage. The storage device 204 stores incoming and outbound network messages and instructions for the processor 206. The storage device 204 also includes the application database 210. The application database 210 may be a standard database capable of storing and retrieving data on the basis of some index data.

The storage device 204 also includes an application data retriever 214 and an application data updater 216. The method used by the application data retriever 214, according to one embodiment of the present invention, is illustrated in greater detail in connection with FIG. 4. The method used by the application data updater 216, according to one embodiment of the present invention, is illustrated in greater detail in connection with FIG. 5.

FIGS. 3(A) to 3(D) are event traces illustrating the storage and retrieval of application data, instructions, and/or rule sets at an appliance 106 in a typical exchange between a user computer 102 and a web server 110 and/or application server 111, according to one embodiment of the present invention. For the purpose of illustration, FIGS. 3(A) to 3(D) depict an example in which the data, instructions, and/or rule sets are requested by the user according to the HTTP. However, as explained previously, in various embodiments the invention is capable of transmitting, receiving, storing, and retrieving application data, instructions, and/or rule sets in conjunction with various types of servers, various types of data requests, and in conjunction with data requests according to various protocols.

FIGS. 3(A) to 3(D) depict the reception and transmission of messages at the appliance 106. For the purposes of simplicity, these receptions and transmissions are illustrated without the intervening wide area network 103, wide area network point 104, and router or routers 108. Various configurations of network routers and links are implicit in the arrows depicting message reception and transmission among the user computer 102, appliance 106, and web server 110 and/or application server 111.

Figure 3A:
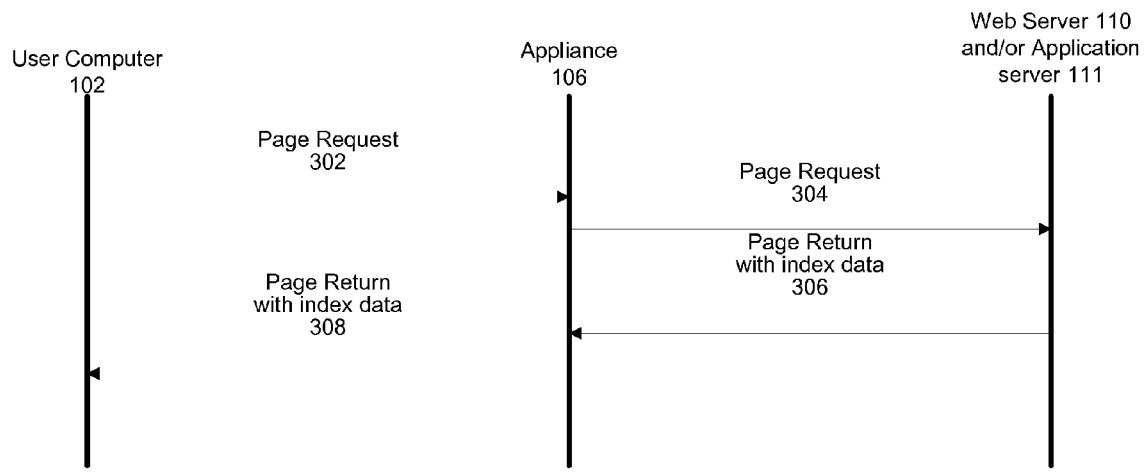
FIGS. 3(A) through 3(D) illustrate the storage and retrieval of application data, instructions, and/or rule sets at an appliance in a typical exchange with a web server and/or application server, according to several embodiment of the present invention.

FIG. 3(A) depicts an HTTP exchange between the user computer 102 and the web server 110 not requiring the retrieval or storage of application data, instructions, and/or rule sets. The user computer 102 sends a page request 302 to the appliance 106; more particularly, the page request 302 is intended for the web server 110 but is intercepted by the appliance 106. Because the page request 302 does not contain index data, it is not necessary to retrieve any application data, instructions, and/or rule sets, so the appliance 106 forwards the message on to the web server 110 as the page request 304.

The web server 110 receives the page request 304 and retrieves the appropriate web page. The method for responding to a page request in the web server 110 is described in greater detail herein with reference to FIG. 6. The web server 110 generates a page return, includes in the page return some index data, and transmits the resulting page return with index data 306.

The appliance 106 receives the page return with index data 306. Because the page return with index data 306 does not contain application data, instructions, and/or rule sets, it is not necessary to store any application data, instructions, and/or rule sets, so the appliance 106 forwards the message on to the user computer 102 as the page return with index data 308.

The user computer 102 receives the page return with index data 308. The user computer 102 displays or saves the page and stores the index data locally. Various methods for storing index data locally are available; a non-exhaustive set of examples has been given herein with reference to FIG. 1.

Figure 3B:
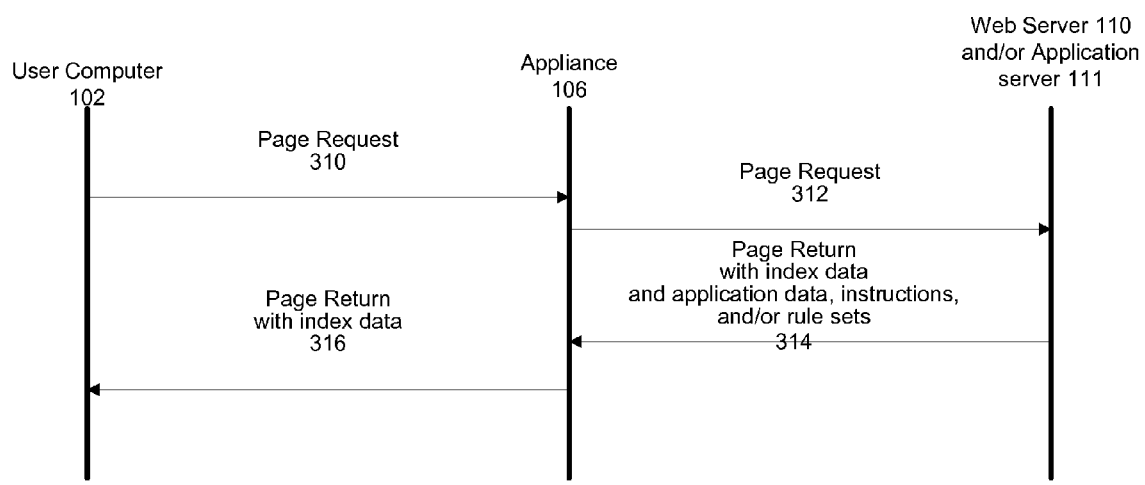

FIG. 3(B) depicts an HTTP exchange between the user computer 102 and the web server 110 for which it is desired to store application data, instructions, and/or rule sets. The user computer 102 sends a page request 310 to the appliance 106. Because the page request 310 does not contain index data, it is not necessary to retrieve any application data, instructions, and/or rule sets, so the appliance 106 forwards the message on to the web server 110 as the page request 312.

The web server 110 receives the page request 312 and retrieves the appropriate web page. The web server 110 generates a page return. In this case, however, the processing of the page request 312 generates some application data, instructions, and/or rule sets. The web server 110 generates a page return, includes in the page return index data, inserts the application data, instructions, and/or rule sets, and transmits the resulting page return with index data and application data, instructions, and/or rule sets 314. As described herein, the application data, instructions, and/or rule sets can be any items that are useful for operation of the web-based application.

The appliance 106 receives the page return with index data and application data, instructions, and/or rule sets 314. In this example the page return with index data and application data, instructions, and/or rule sets 314 does contain application data, instructions, and/or rule sets. Accordingly, if appropriate, the appliance 106 stores the application data in the application database. The method for storing application data in the appliance 106 is described in greater detail herein with reference to FIG. 5. If the application data includes processing instructions and/or rule sets, the appliance 106 extracts and executes the processing instructions and/or rule sets. According to one embodiment of the present invention, the appliance 106 removes the application data, instructions, and/or rule sets from the message and forwards the resulting page return with index data 316 to the user computer 102.

The user computer 102 receives the page return with index data 316. The user computer 102 displays or saves the page and stores the index data locally. Various methods for storing index data locally are available; a non-exhaustive set of examples has been given herein with reference to FIG. 1.

Figure 3C:
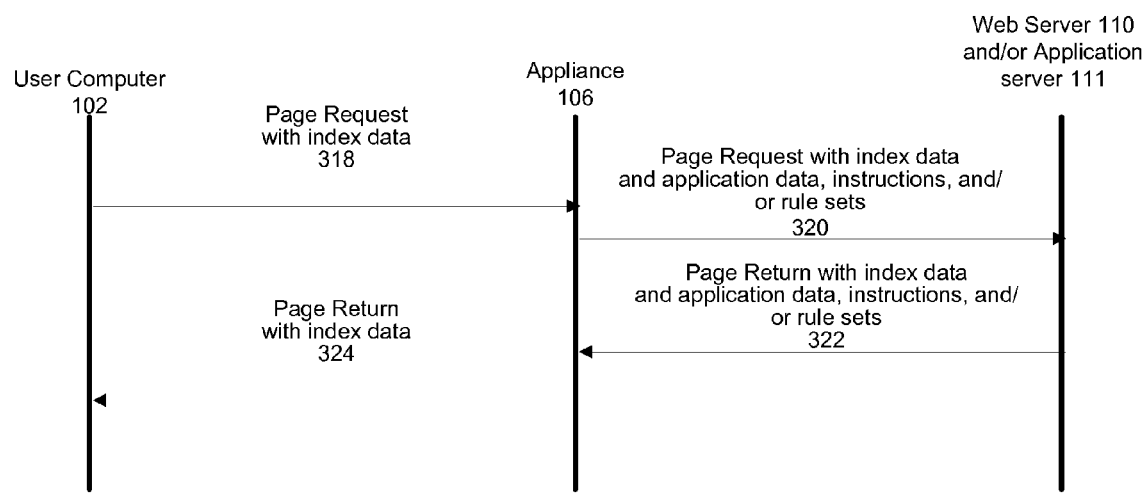

FIG. 3(C) depicts an HTTP exchange between the user computer 102 and the web server 110 requiring the retrieval and updating of application data, instructions, and/or rule sets. The user computer 102 sends a page request with index data 318 to the appliance 106. The page request with index data 318 contains index data, so the appliance 106 searches the application database for associated application data, instructions, and/or rule sets. The method for retrieving application data, instructions, and/or rule sets in the appliance 106 is described in greater detail herein with reference to FIG. 4.

If the appliance 106 finds application data, instructions, and/or rule sets associated with the index data, the appliance 106 inserts that application data, instructions, and/or rule sets into the message, and forwards the resulting page request with index data and application data 320 to the web server 110.

The web server 110 receives the page request with index data and application data, instructions, and/or rule sets 320 and retrieves the appropriate web page. The web server 110 may customize or retrieve the web page differently depending on the application data, instructions, and/or rule sets. If there are processing instructions, the software at the web server 110 extracts and executes the processing instructions.

The web server 110 generates a page return. In this case, however, the processing of the page request with index data and application data, instructions, and/or rule sets 320 generates some new or updated application data, instructions, and/or rule sets requiring storage. The web server 110 generates a page return, includes in the page return either the same or different index data, inserts the new or updated application data, instructions, and/or rule sets, and transmits the resulting page return with index data and application data, instructions, and/or rule sets 322.

The appliance 106 receives the page return with index data and application data, instructions, and/or rule sets 322. In the case that the page return with index data and application data, instructions, and/or rule sets 322 contains new or updated application data, instructions, and/or rule sets, the appliance 106 stores or updates the application data, instructions, and/or rule sets in the application database appropriately. According to one embodiment of the present invention, the appliance 106 removes the application data, instructions, and/or rule sets from the message and forwards the resulting page return with index data 324 to the user computer 102.

The user computer 102 receives the page return with index data 324. The user computer 102 displays or saves the page as indicated by the user and stores the index data in a local cache. Various methods for storing index data locally are available; a non-exhaustive set of examples has been given herein with reference to FIG. 1.

As shown, by installing the appliance 106 in the data path between the user computer 102 and the web server 110, application data, instructions, and/or rule sets is securely stored and retrieved without additional complication or steps on the part of either the user computer 102 or the web server 110. The processing instructions and/or rule sets can be intended for either or both of the appliance 106 and the web server 110.

Figure 3D:
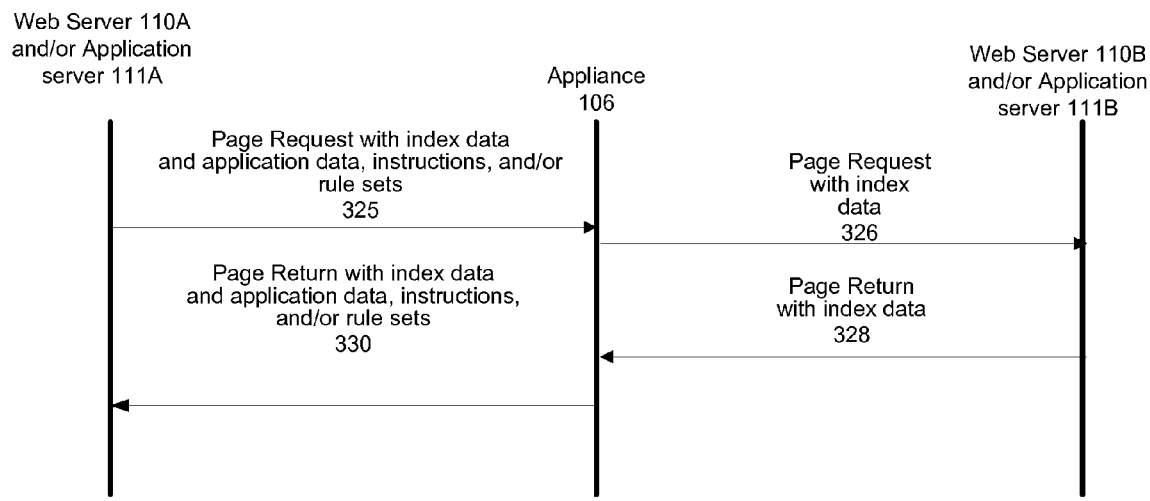

FIG. 3(D) depicts an HTTP exchange between the web server 110A and the web server 110B including the retrieval and updating of application data, instructions, and/or rule sets. Inserting an appliance in the data path between a first web server and a second web server may be useful, for example, in a confidential transaction in which the first web server processes a confidential portion of the transaction and the second web server processes a non-confidential portion of the transaction. The web server 110A sends a page request with index data and application data, instructions, and/or rule sets 325 to the appliance 106. The web server 110A may send a page request with index data and application data, instructions, and/or rule sets 325, for example, in response to a page request from a user computer not shown. In the case that the page return with index data and application data, instructions, and/or rule sets 325 contains new or updated application data, instructions, and/or rule sets, the appliance 106 stores or updates the application data, instructions, and/or rule sets in the application database appropriately. Again, if there are processing instructions and/or rule sets, the appliance 106 executes these as appropriate. According to one embodiment of the present invention, the appliance 106 removes the application data, instructions, and/or rule sets from the message and forwards the resulting page request with index data 326 to the web server 110B.

The web server 110E receives the page request with index data 326 and retrieves the appropriate web page. The web server 110E generates a page return, includes in the page return either the same or different index data and transmits the resulting page return with index data 328.

The page return with index data 328 contains index data, so the appliance 106 searches the application database for associated application data, instructions, and/or rule sets. A method for retrieving application data, instructions, and/or rule sets in the appliance 106 is described in greater detail herein with reference to FIG. 4.

If the appliance 106 finds application data, instructions, and/or rule sets associated with the index data, the appliance 106 inserts that application data, instructions, and/or rule sets into the message, and forwards the resulting page return with index data and application data, instructions, and/or rule sets 330 to the web server 110A.

The web server 110A receives the page return with index data and application data, instructions, and/or rule sets 330 and handles the page return appropriately. The web server 110A may customize or handle differently the web page depending on the application data, instructions, and/or rule sets. The web server 110A may forward the page return, either with or without application data, instructions, and/or rule sets, on to a user computer not shown. If there are processing instructions and/or rule sets, the web server 110A executes these items as appropriate.

One skilled in the art will recognize that the index data could also originate in the appliance 106. The appliance 106 can extract and store application data/instructions and replace them with index data. When subsequent requests contain that index data, the appliance 106 replaces it with the corresponding application data/instructions.

Figure 4:
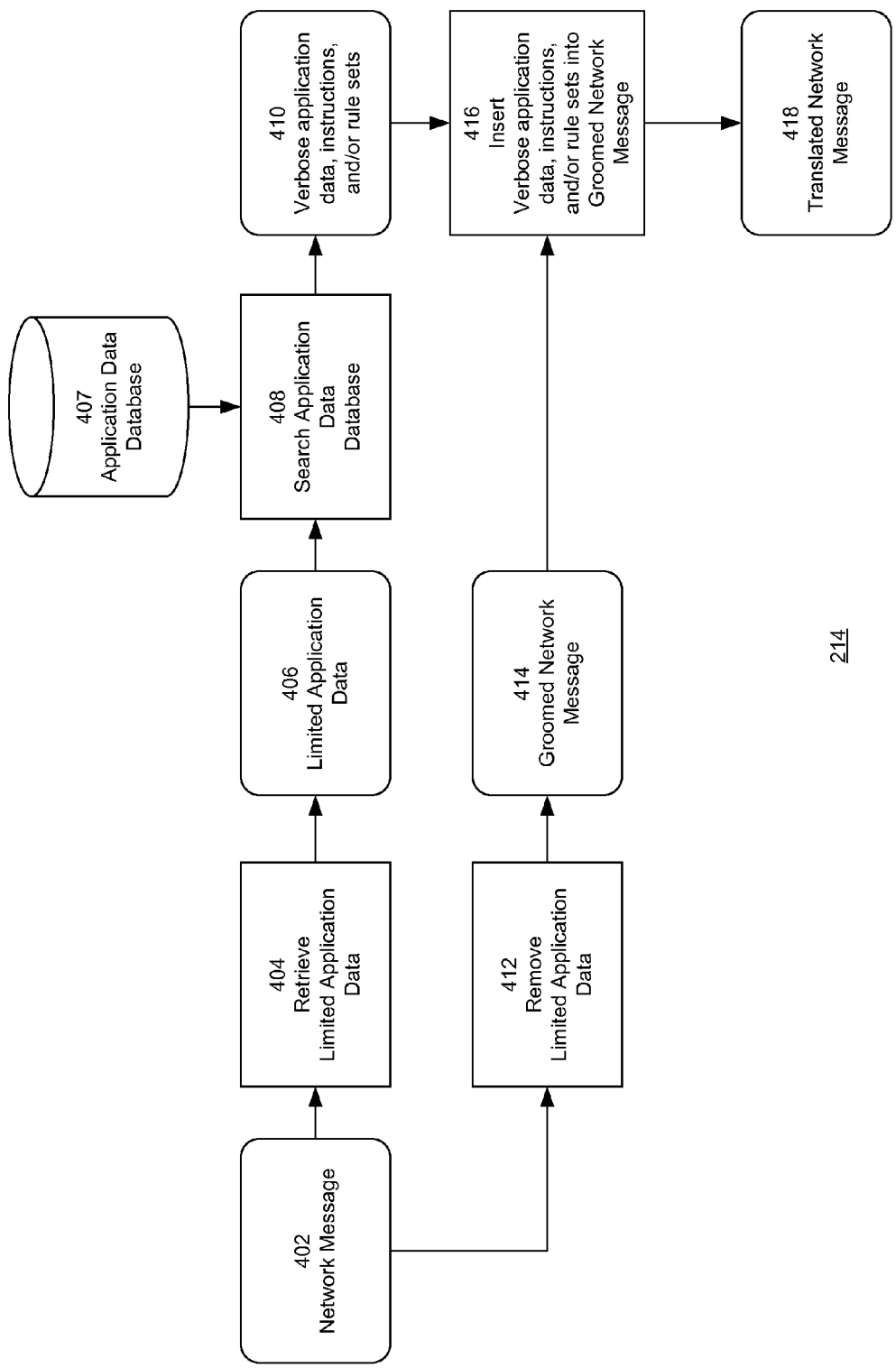
FIG. 4 is a flowchart illustrating a method for retrieving application data, instructions, and/or rule sets in an appliance, according to one embodiment of the present invention.

FIG. 4 illustrates a method for retrieving application data, instructions, and/or rule sets in an appliance, according to one embodiment of the present invention. In one embodiment, the method is performed by the application data retriever 214. A network message 402 has been received by the appliance 106. In the example illustrated, the network message 402 includes some limited application data 406 that has been previously stored in the application database 407 as associated with some verbose application data, instructions, and/or rule sets 410. The processing instructions can be designed to be executed by the appliance to create one or more new requests sent to the web server.

According to one embodiment of the present invention, the limited application data 406 is analogous to the index data described herein with reference to FIG. 3. The limited application data 406 may be any data from which it is possible to retrieve verbose application data, instructions, and/or rule sets, which may include processing instructions if desired. The limited application data 406 may be contained in the network message 402 in any number of manners. For example the limited application data 406 could be contained in a cookie field, a hidden form field, a ViewState field, or somewhere else in the network message 402. Limited application data 406 could be contained in the header of the network message 402, for example, in the case in which the user computer 102 transmits the limited application data 406 in the form of a URL query string.

The application data retriever 214 retrieves 404 the limited application data 406 from the network message 402. The application data retriever 214 searches 408 the application database 407 for verbose application data, instructions, and/or rule sets 410 retrievable by the limited application data 406.

According to one embodiment of the present invention, the network message 402 can be an HTTP page request and the limited application data 406 can be stored in a cookie. For example, the application data retriever 214 would retrieve 404 the limited application data 406 by reading the cookie in the network message 402, where the network message 402 is an HTTP page request containing a cookie.

The application data retriever 214 optionally removes 412 the limited application data from the network message 402 to produce a groomed network message 414. In some embodiments it is not necessary to remove 412 the limited application data, while in other embodiments this procedure is desirable. If this optional procedure is not implemented, the groomed network message 414 is equivalent to the network message 402.

The application data retriever 214 inserts 416 the verbose application data, instructions, and/or rule sets 410 into the groomed network message 414 to produce a translated network message 418. The translated network message 418 is ready to be sent to the web server 110, as illustrated in FIG. 3. The translated network message 418 is of a form such that the request contained therein may be processed by the web server 110 without further need for external application data retrieval. The translated network message 418 may include processing instructions to be performed by the recipient, if appropriate.

Figure 5A:
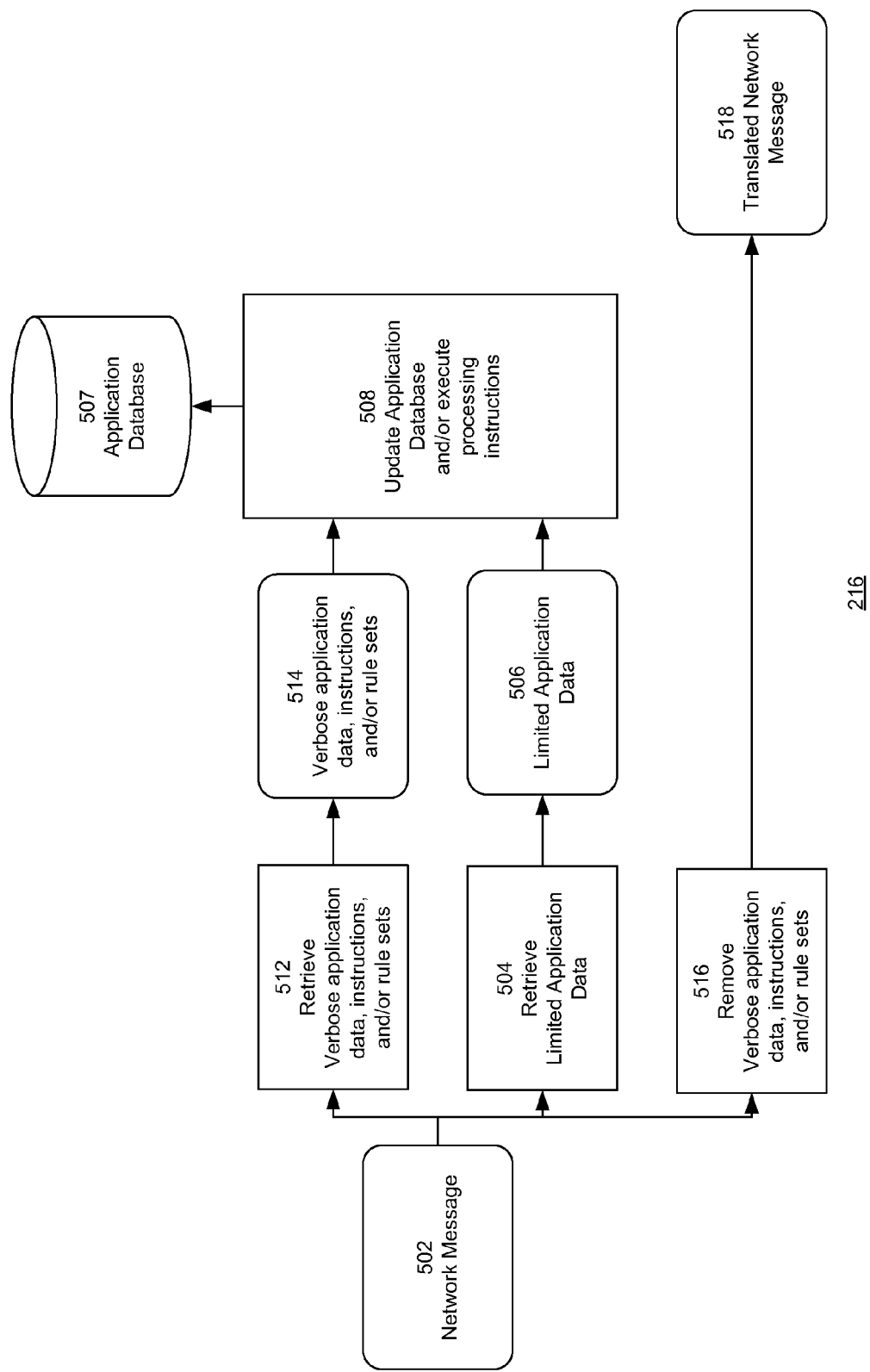
FIG. 5(A) is a flowchart illustrating a method for storing application data, instructions, and/or rule sets in an appliance, according to one embodiment of the present invention.

FIG. 5(A) illustrates a method for storing application data, instructions, and/or rule sets in an appliance, according to one embodiment of the present invention. In one embodiment, the method is performed by the application data updater 216. A network message 502 has been received by the appliance 106. In this example, the network message 502 comprises some verbose application data, instructions, and/or rule sets 514.

Additionally, according to one embodiment of the present invention, the network message 502 includes some limited application data. The application data updater 216 retrieves 504 limited application data 506 from the network message 502. According to one embodiment of the present invention, the limited application data 506 may be analogous to the index data described herein with reference to FIG. 3. The limited application data 506 may be any data with which it is possible to associate verbose application data, instructions, and/or rule sets in the application database.

The limited application data 506 may be contained in the network message 502 in any number of manners. For example the limited application data 406 could be contained in a cookie field, a hidden form field, in the header of the network message, or somewhere else in the network message 502.

According to one embodiment of the present invention, the network message 502 can be an HTTP page response and the limited application data 506 can be contained in a cookie. For example, the application data updater 216 would retrieve 504 the limited application data 506 by reading the cookie from the network message 502, where the network message 502 is an HTTP page response containing a cookie.

The application data updater 216 retrieves 512 verbose application data, instructions, and/or rule sets 514 from the network message 502.

The application data updater 216 updates 508 the application database 507 with the verbose application data, and executes any instructions, and/or rule sets 514 using the limited application data 506 as an index. If some other verbose application data, instructions, and/or rule sets is already indexed by the limited application data 506 in the application database 507, the application data updater 216 may append or overwrite the other verbose application data, instructions, and/or rule sets with the verbose application data, instructions, and/or rule sets 514. If there are processing instructions and/or rule sets, the appliance 106 executes these.

In some cases, processing instructions can be stored along with application data in the database 507 and then executed in the future when the appliance 106 receives request from the user computer 102 and retrieves application data along with processing instructions from the database 507.

The application data updater 216 optionally removes 516 the verbose application data, instructions, and/or rule sets from the network message 502 to produce a translated network message 518. In some embodiments it is not necessary to remove 516 the verbose application data, instructions, and/ or rule sets, while in other embodiments this procedure is desirable. If this optional step is not implemented, the translated network message 518 is equivalent to the network message 502.

The translated network message 518 is ready to be sent to the user computer 102, as illustrated in FIG. 3. The translated network message 518 is of a form such that the request contained therein may be interpreted by the user computer 102 as a standard message, and the application database 507 has been updated to reflect changes or additions of verbose application data, instructions, and/or rule sets.

Figure 5B:
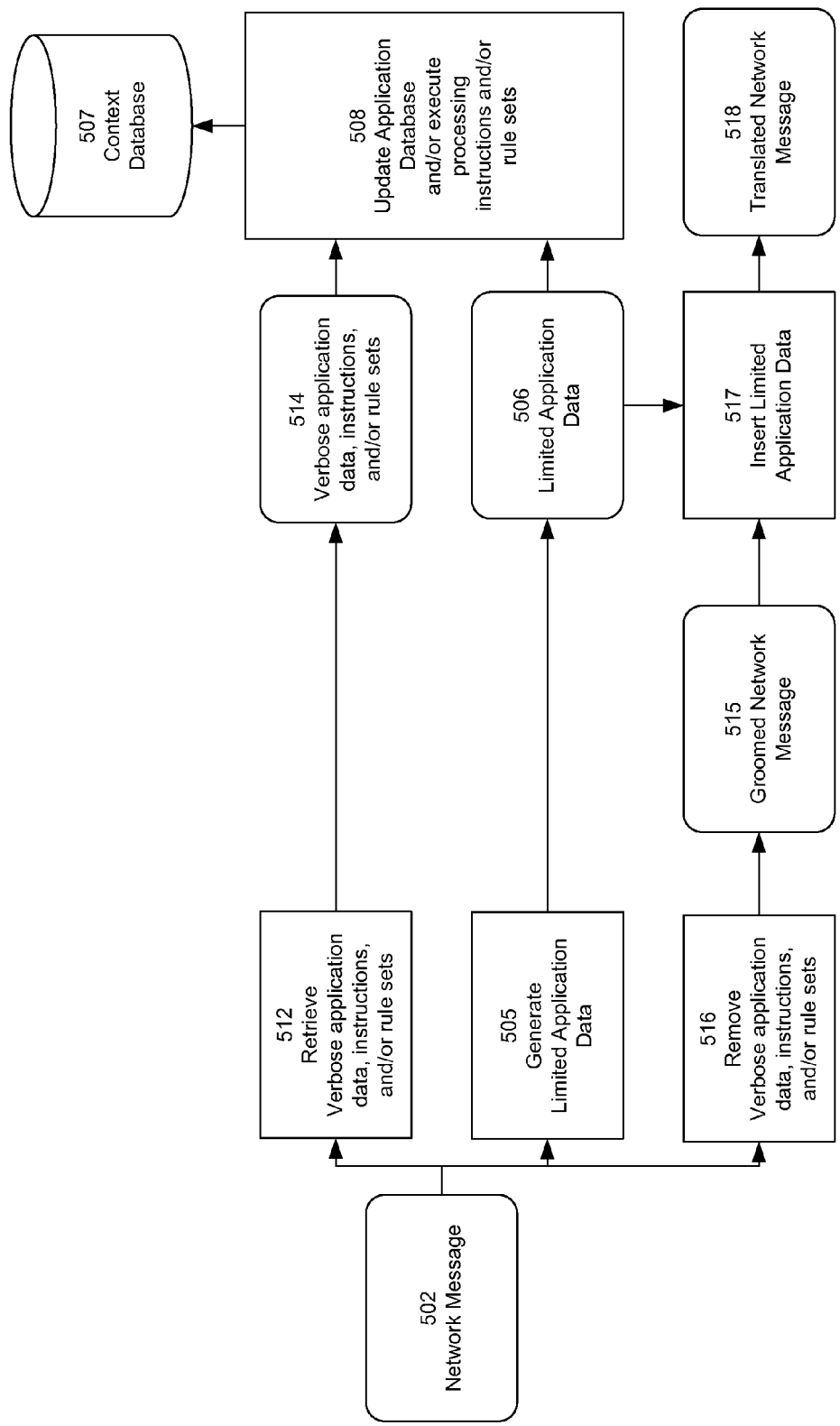
FIG. 5(B) is a flowchart illustrating a method for storing application data, instructions, and/or rule sets in an appliance, according to another embodiment of the present invention.

FIG. 5(B) illustrates a method for storing application data, instructions, and/or rule sets in an appliance, according to another embodiment of the present invention. In one embodiment, the method is performed by the application data updater 216. A network message 502 has been received by the appliance 106. In this example, the network message 502 comprises some verbose application data, instructions, and/or rule sets 514.

According to another embodiment of the present invention, the application data updater 216 generates 505 limited application data 506. According to one embodiment of the present invention, the limited application data 506 may be analogous to the index data described herein with reference to FIG. 3. The limited application data 506 may be any data with which it is possible to associate verbose application data, instructions, and/or rule sets in the application database.

According to one embodiment of the present invention, the application data updater retrieves 512 verbose application data, instructions, and/or rule sets 514, and updates 508 the application database 507 as described herein with reference to FIG. 5(A). If appropriate, the application data updater executes any processing instructions.

The application data updater 216 optionally removes 516 the verbose application data, instructions, and/or rule sets from the network message 502 to produce a groomed network message 515. If this optional step is not implemented, the groomed network message 515 is equivalent to the network message 502.

The application data updater 216 inserts 517 the limited application data 506 into the groomed network message 515 to produce a translated network message 518. The limited application data 506 may be inserted 517 into the network message 502 in any number of manners. For example the limited application data 406 may be stored in a cookie field, a hidden form field, in the header of the translated network message 518, or somewhere else in the translated network message 518.

The translated network message 518 is ready to be sent to the user computer 102, as illustrated in FIG. 3. The translated network message 518 is of a form such that the response contained therein may be interpreted by the user computer 102 as a standard message, and the application database 507 has been updated to reflect changes or additions of verbose application data, instructions, and/or rule sets.

FIG. 6 is a flowchart illustrating a method for responding to a page request containing application data, instructions, and/or rule sets, according to one embodiment of the present invention. In one embodiment, the method is performed by the web server 110. While FIG. 6 illustrates an example of handling an HTTP request containing application data, instructions, and/or rule sets in a web server, it teaches a method for handling any type of data request in any type of data server. The example of HTTP has been chosen for the purpose of illustration, but does not limit the scope of the invention.

A network message 602 has been received by the web server 110 or application server 111 as illustrated in FIG. 3. The network message 602 corresponds to the translated network message 418 prepared by the method illustrated in FIG. 4. As such, the network message 602 contains verbose application data, instructions, and/or rule sets 606. The web server 110 and/or application server 111 retrieves 604 the verbose application data, instructions, and/or rule sets 606 from the network message 602.

The web server 110 and/or application server 111 optionally removes 610 the verbose application data, instructions, and/or rule sets to produce a network message equivalent to the network message 402, i.e. equivalent to the network message as originally received by the method for application data retrieval as illustrated in FIG. 4. In the example shown in FIG. 6, this network message is a standard HTTP request 612. If the verbose application data, instructions, and/or rule sets 606 are stored in the network message 602 in such a way as to not interfere with the normal processing of an HTTP request, the network message 602 is already in the form of a standard HTTP request 612, and it may not be desired to remove 610 the verbose application data, instructions, and/or rule sets.

The web server 110 and/or application server 111 passes the verbose application data, instructions, and/or rule sets 606 and the standard HTTP request 612 to a web service application 608. The web service application 608 handles the standard HTTP request 606 using any of the well known methods in the art, referring to the verbose application data, instructions, and/or rule sets 606 as necessary. If there are processing instructions and/or rule sets, the web service application 608 executes 623 these as appropriate. The web service application 608 returns a standard HTTP response 614 and, in some instances, updated verbose application data, instructions, and/or rule sets 616. If the updated verbose application data, instructions, and/or rule sets 616 are present, the web server 110 and/or application server 111 inserts 618 the updated verbose application data, instructions, and/or rule sets 616 into the standard HTTP response 614.

The web server 110 and/or application server 111 optionally inserts 620 limited application data into the resulting message as necessary to produce a responsive network message 622. Examples of methods in which limited application data may be stored in a network message are given herein with reference to FIGS. 4-5. According to one embodiment of the present invention, limited application data is inserted by the web server 110 and/or application server 111. According to another embodiment of the present invention, limited application data is inserted by the application data updater 216.

The responsive network message 622 is ready to be transmitted to the appliance 106 as illustrated in FIG. 3. The responsive network message 622 is of the form so that it may be processed by the appliance 106 as illustrated in FIG. 5.

According to one embodiment of the present invention, multiple copies of the application database are maintained for the purposes of backing up application data, instructions, and/or rule sets in the event of failure of the appliance. Any of the well-known methods for providing redundant data services are applicable to the invention in the interest of failure prevention or response.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. In a network device situated in a communication path between a first network node and a second network node, the first network node comprising a server belonging to a first group of servers, a method for maintaining at least one selected from the group consisting of application data, instructions, and rule sets, comprising:
    at the network device, performing the steps of:
        intercepting a first network message from the first network node and intended for the second network node, the first network message comprising at least one selected from the group consisting of application data, instructions, and rule sets;
        storing a portion of the first network message at a storage device associated with the network device, the stored portion comprising at least one of application data, instructions, and rule sets;
        removing the stored portion from the first network message to generate a groomed network message, the groomed network message comprising an index identifying the stored portion;
        transmitting the groomed network message from the network device to the second network node;
        intercepting a second network message from the second network node and intended for a server belonging to the first group of servers, the second network message comprising index data identifying the stored portion;
        responsive to intercepting the second network message, retrieving, from the storage device associated with the network device, the portion identified by the index data; and
        transmitting the second network message and the retrieved portion to a selected server belonging to the first group of servers.

2. The method of claim 1, wherein the stored portion of the first network message comprises at least one instruction to be performed by the network device.

3. The method of claim 1, wherein the first network message comprises at least one selected from the group consisting of:
    a page request; and
    a response to a page request.

4. The method of claim 1, wherein each network node comprises at least one selected from the group consisting of:
    a client; and
    a server.

5. In a network device situated in a communication path between a first network node and a second network node, a method for maintaining at least one selected from the group consisting of application data, instructions, and rule sets, comprising:

at the network device, performing the steps of:
  intercepting a first network message from the first network node and intended for the second network node, the first network message comprising at least one selected from the group consisting of application data, instructions, and rule sets;
  storing a portion of the first network message at a storage device associated with the network device, the stored portion comprising at least one of application data, instructions, and rule sets;
  removing the stored portion from the first network message to generate a groomed network message, the groomed network message comprising an index identifying the stored portion;
  transmitting the groomed network message from the network device to the second network node;
  intercepting a second network message from the second network node and intended for the first network node, the second network message comprising index data identifying the stored portion;
  responsive to intercepting the second network message, retrieving, from the storage device associated with the network device, the portion identified by the index data; and
  transmitting the second network message and the retrieved portion to the first network node.

6. The method of claim 5, wherein:
the stored portion of the first network message comprises at least one instruction to be performed by the network device;
and wherein the method further comprises:
performing the at least one instruction at the network device.

7. The method of claim 5, wherein the first network message comprises at least one selected from the group consisting of:
  a page request; and
  a response to a page request.

8. The method of claim 5, wherein each network node comprises at least one selected from the group consisting of:
  a client; and
  a server.

9. A computer program product for maintaining at least one selected from the group consisting of application data, instructions, and rule sets in a network device situated in a communication path between a first network node and a second network node, the first network node comprising a server belonging to a first group of servers, comprising:
  a non-transitory computer-readable storage medium; and
  computer program code, encoded on the medium, for causing a network device to perform the steps of:
    intercepting a first network message from the first network node and intended for the second network node, the first network message comprising at least one selected from the group consisting of application data, instructions, and rule sets;
    storing a portion of the first network message at a storage device associated with the network device, the stored portion comprising at least one of application data, instructions, and rule sets;
    removing the stored portion from the first network message to generate a groomed network message, the groomed network message comprising an index identifying the stored portion;
    transmitting the groomed network message from the network device to the second network node;
    intercepting a second network message from the second network node and intended for a server belonging to the first group of servers, the second network message comprising index data identifying the stored portion;
    responsive to intercepting the second network message, retrieving, from the storage device associated with the network device, the portion identified by the index data; and
    transmitting the second network message and the retrieved portion to a selected server belonging to the first group of servers.

10. The computer program product of claim 9, wherein the stored portion of the first network message comprises at least one instruction to be performed by the network device.

11. The computer program product of claim 9, wherein the first network message comprises at least one selected from the group consisting of:
  a page request; and
  a response to a page request.

12. The computer program product of claim 9, wherein each network node comprises at least one selected from the group consisting of:
  a client; and
  a server.

13. A computer program product for maintaining at least one selected from the group consisting of application data, instructions, and rule sets in a network device situated in a communication path between a first network node and a second network node, comprising:
  a non-transitory computer-readable storage medium; and
  computer program code, encoded on the medium, for causing a network device to perform the steps of:
    intercepting a first network message from the first network node and intended for the second network node, the first network message comprising at least one selected from the group consisting of application data, instructions, and rule sets;
    storing a portion of the first network message at a storage device associated with the network device, the stored portion comprising at least one of application data, instructions, and rule sets;
    removing the stored portion from the first network message to generate a groomed network message, the groomed network message comprising an index identifying the stored portion;
    transmitting the groomed network message from the network device to the second network node;
    intercepting a second network message from the second network node and intended for the first network node, the second network message comprising index data identifying the stored portion;
    responsive to intercepting the second network message, retrieving, from the storage device associated with the network device, the portion identified by the index data; and
    transmitting the second network message and the retrieved portion to the first network node.

14. The computer program product of claim 13, wherein the stored portion of the first network message comprises at least one instruction to be performed by the network device.

15. The computer program product of claim 13, wherein the first network message comprises at least one selected from the group consisting of:
  a page request; and
  a response to a page request.

16. The computer program product of claim 13, wherein each network node comprises at least one selected from the group consisting of:
- a client; and
- a server.

17. A network device situated in a communication path between a first network node and a second network node, the first network node comprising a server belonging to a first group of servers, for maintaining at least one selected from the group consisting of application data, instructions, and rule sets, comprising:
- a communication module, for intercepting a first network message from the first network node and intended for the second network node, the first network message comprising at least one selected from the group consisting of application data, instructions, and rule sets;
- a storage device, for storing a portion of the first network message, the stored portion comprising at least one of application data, instructions, and rule sets; and
- a processor, for removing the stored portion from the first network message to generate a groomed network message, the groomed network message comprising an index identifying the stored portion;

wherein:
the communication module transmits the groomed network message from the network device to the second network node;
the communication module intercepts a second network message from the second network node and intended for a server belonging to the first group of servers, the second network message comprising index data identifying the stored portion;
responsive to intercepting the second network message, the processor retrieves, from the storage device associated with the network device, the portion identified by the index data; and
the communication module transmits the second network message and the retrieved portion to a selected server belonging to the first group of servers.

18. The device of claim 17, wherein the stored portion of the first network message comprises at least one instruction to be performed by the network device, and wherein the processor performs the at least one instruction.

19. The device of claim 17, wherein the first network message comprises at least one selected from the group consisting of:
- a page request; and
- a response to a page request.

20. The device of claim 17, wherein each network node comprises at least one selected from the group consisting of:
- a client; and
- a server.

21. A network device situated in a communication path between a first network node and a second network node, for maintaining at least one selected from the group consisting of application data, instructions, and rule sets, comprising:
- a communication module, for intercepting a first network message from the first network node and intended for the second network node, the first network message comprising at least one selected from the group consisting of application data, instructions, and rule sets;
- a storage device, for storing a portion of the first network message, the stored portion comprising at least one of application data, instructions, and rule sets; and
- a processor, for removing the stored portion from the first network message to generate a groomed network message, the groomed network message comprising an index identifying the stored portion;

wherein:
the communication module transmits the groomed network message from the network device to the second network node;
the communication module intercepts a second network message from the second network node and intended for the first network node, the second network message comprising index data identifying the stored portion;
responsive to intercepting the second network message, the processor retrieves, from the storage device associated with the network device, the portion identified by the index data; and
the communication module transmits the second network message and the retrieved portion to the first network node.

22. The device of claim 21, wherein the stored portion of the first network message comprises at least one instruction to be performed by the network device, and wherein the processor performs the at least one instruction.

23. The device of claim 21, wherein the first network message comprises at least one selected from the group consisting of:
- a page request; and
- a response to a page request.

24. The device of claim 21, wherein each network node comprises at least one selected from the group consisting of:
- a client; and
- a server.

* * * * *